No. 874,308. PATENTED DEC. 17, 1907.
G. E. DANN.
FOLDING BABY CARRIAGE.
APPLICATION FILED AUG. 28, 1907.
2 SHEETS—SHEET 2.
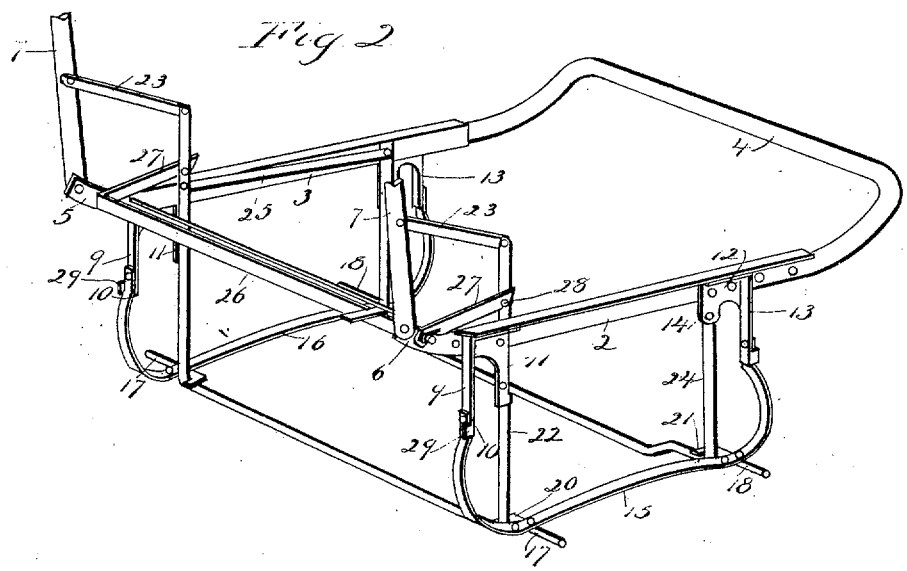
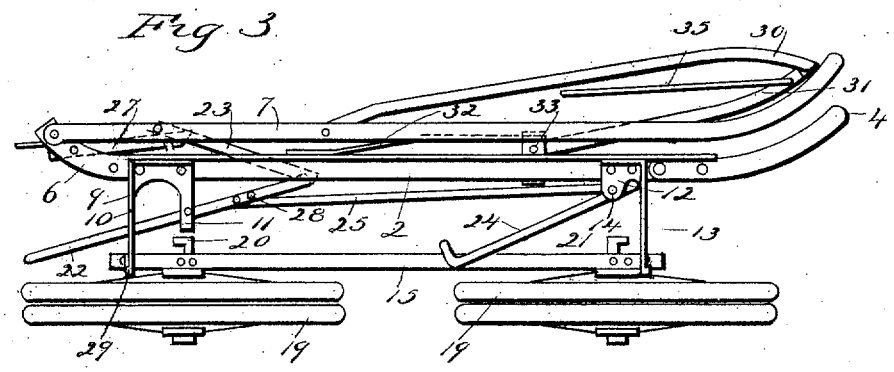

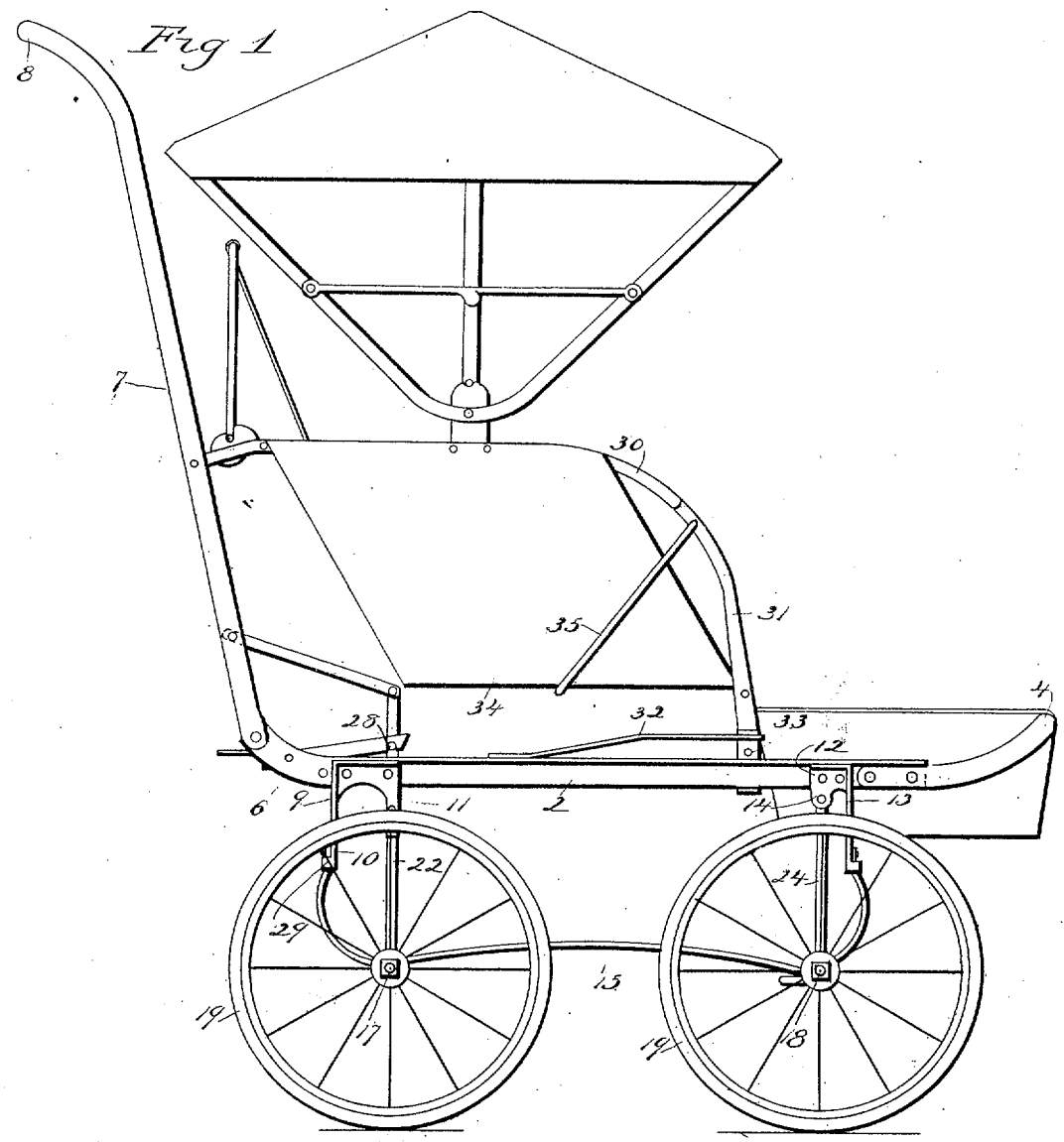

UNITED STATES PATENT OFFICE.

GEORGE E. DANN, OF NEW HAVEN, CONNECTICUT, ASSIGNOR TO THE RATTAN MFG. CO., OF NEW HAVEN, CONNECTICUT, A CORPORATION.

FOLDING BABY-CARRIAGE.

No. 874,308.  Specification of Letters Patent.  Patented Dec. 17, 1907.

Application filed August 28, 1907. Serial No. 390,471.

*To all whom it may concern:*

Be it known that I, GEORGE E. DANN, a citizen of the United States, residing at New Haven, in the county of New Haven and State of Connecticut, have invented a new and useful Improvement in Folding Baby-Carriages; and I do hereby declare the following, when taken in connection with the accompanying drawings and the letters of reference marked thereon, to be a full, clear, and exact description of the same, and which said drawings constitute part of this specification, and represent, in—

Figure 1 a side view of a carriage constructed in accordance with my invention, shown in the open position. Fig. 2 a perspective view of the frame portion of the carriage, with the wheels removed. Fig. 3 a side view of the frame work of a baby carriage shown in the folded position.

This invention relates to an improvement in folding baby carriages, and particularly to those of the more substantial class, that is, carriages which are expected to sustain the use of the regular standing carriage and yet be capable of folding into small space, the object of the invention being to provide a carriage which when in the open position shall be extremely rigid, and is an improvement on the carriage shown and described in application filed July 8th, 1907, Serial No. 382,613; and the invention consists in the construction hereinafter described and particularly recited in the claims.

The main part of this present invention relates especially to the running gear. The carriage comprises side bars 2, 3, connected at the forward ends by a dash rail 4, the rear ends 5, 6, being slightly curved upward and pivoted to the handle bars 7 which may be formed integral with the handle 8.

Secured to and extending downward from the rear of the side bars are brackets 9 having rear axle arms 10 and brace arms 11, and extending downward from the forward ends of the side bars are similar brackets 12 having forward axle arms 13 and brace arms 14. Pivoted to the lower ends of these arms 10 and 13 are axle frames 15 and 16 preferably being formed from a single strip which is bowed from one arm to the other. These axle frames carry axles 17 and 18 on which the wheels 19 are mounted, and formed integral with the axles and extending inward therefrom are hooks 20 and 21. Pivoted to the brace arms 11 are braces 22 which extend down for engagement with the hooks 20 and which extend above the side bars for connection by links 23 with the handle bars 7. Pivoted to the forward brace arms 14 are similar braces 24 which engage with the hooks 21 while their upper ends are connected by links 25 with the braces 22.

Pivoted to the rear ends 5 and 6 of the side bars is a latch bar 26 having forwardly extending arms 27 which engage with pins 28 on the braces 22, so that when the braces 22 and 24 are engaged with the respective axle hooks 20 and 21 the parts of the frame will be locked in that open position.

To limit the outward movement of the axle frames the arms 9 are preferably formed with lugs 29 against which the axle frames strike.

The upper part of the carriage is substantially the same as in the application before referred to and comprises arms 30 connected by braces 31 with springs 32 which are secured to the side bars, except that instead of securing the braces to the ends of the springs 32 the said springs are provided at their outer ends with downwardly extending arms 33 to which the braces are pivoted at a point below the outer ends of the springs which facilitates folding. The seat 34 is supported by a seat bracket 35 which is formed from a U-shaped piece of wire pivoted to the arm braces 31. The back and top, if there be one, may be of any approved construction not here necessary to refer to. The carriage as has thus far been described, is in the open position; and to close it the latch bar 26 is turned to lift the arms 27 out of engagement with the pins 28 which permits the arms to be folded forward, and as the arms fold forward the braces 22 and 24 fold rearward and pass out of engagement with the axle hooks 20 and 21 so that when the braces are in the folded position the axle frames may be folded inward. As in the previous construction the seat moves forward when the handle arms are turned forward.

To open the carriage it is only necessary to grasp the handle 8 and lift it when the weight of the parts will bring them into their open position, the movement of the braces 22 and 24 forcing the axle frames 15 and 16 outward.

It will be noted that by forming the hooks for the braces 22 and 24 at a point closely adjacent to the axles, a very rigid frame is secured.

I claim:—

1. A folding baby carriage comprising side bars, arms extending downward therefrom, axle frames pivoted to said arms, axles and axle hooks carried by said frames, and braces connected with said side bars and adapted to engage with said axle hooks, substantially as described.

2. A folding baby carriage comprising side bars, arms extending downward therefrom, axle frames pivoted to said arms, axles secured to said frames and formed with inwardly extending integral hooks, and braces pivotally connected with said side bars and adapted to engage with said axle hooks, substantially as described.

3. A folding baby carriage comprising side bars, arms extending downward therefrom, axle frames pivoted to said arms, axles and axle hooks carried by said frames, rear and forward braces pivotally connected with said side bars and adapted to be engaged by said hooks, links connecting said braces, handle bars connected with said bars, and links connecting said handle bars with the said rear braces.

4. A folding baby carriage comprising side bars, arms extending downward therefrom, axle frames pivoted to said arms, axles and axle hooks carried by said frames, rear and forward braces pivotally connected with said side bars and adapted to be engaged by said hooks, links connecting said braces, handle bars connected with said bars, links connecting said handle bars with the said rear braces, and latches pivotally connected with the side bars and adapted to engage with said rear braces.

5. A folding baby carriage comprising side bars, arms extending downward therefrom and formed at their lower ends with stop lugs, axle frames pivoted to said arms, axles and axle hooks carried by said frames, braces pivotally connected with said side bars and adapted to engage with said axle hooks, substantially as described.

6. In a folding baby carriage, the combination with the side bars thereof, of handle bars pivoted thereto, springs secured to said side bars and extending upwardly and forwardly therefrom, arm braces connected with said springs, arms connected with said braces and with the handle bars, and a seat-support formed from a single piece of metal the ends of which are pivoted to the arm braces, substantially as described.

7. In a folding baby carriage, the combination with the side bars thereof, of handle bars pivoted thereto, springs secured to said side bars and extending upwardly and forwardly therefrom, said springs provided at their outer ends with downwardly extending spring-arms, arm-braces pivoted to said spring-arms, arms connected with said braces and with the handle bars, substantially as described.

In testimony whereof, I have signed this specification in the presence of two subscribing witnesses.

GEO. E. DANN.

Witnesses:
FREDERIC C. EARLE,
CLARA L. WEED.